United States Patent
Nagaharini et al.

(10) Patent No.: US 12,483,569 B2
(45) Date of Patent: Nov. 25, 2025

(54) SYSTEM AND METHOD FOR IDENTIFYING UNAUTHORIZED DATA TRAFFIC IN A COMPUTING NETWORK

(71) Applicant: Bank of America Corporation, Charlotte, NC (US)

(72) Inventors: Mallapragada Nagaharini, Vijayawada (IN); Rajalakshmi Arumugam, Chennai (IN); Deshpande Rukmini Ravindra, Latur (IN); Harilakshmi Narayanan, Chennai (IN); Suhasini Mullapudi, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 64 days.

(21) Appl. No.: 18/619,335

(22) Filed: Mar. 28, 2024

(65) Prior Publication Data

US 2025/0310350 A1    Oct. 2, 2025

(51) Int. Cl.
*H04L 9/40*    (2022.01)

(52) U.S. Cl.
CPC ...... *H04L 63/1416* (2013.01); *H04L 63/1425* (2013.01); *H04L 63/20* (2013.01)

(58) Field of Classification Search
CPC .. H04L 63/1416; H04L 63/20; H04L 63/1425
See application file for complete search history.

(56) References Cited

U.S. PATENT DOCUMENTS

| | | | |
|---|---|---|---|
| 9,336,059 B2 | 5/2016 | Brown et al. | |
| 9,983,860 B1 * | 5/2018 | Koty | H04L 67/10 |
| 10,027,768 B2 | 7/2018 | Rao | |
| 10,230,571 B2 | 3/2019 | Rangasamy et al. | |
| 10,382,266 B1 | 8/2019 | Balakrishnan et al. | |
| 10,684,940 B1 * | 6/2020 | Kayal | G06F 11/3688 |
| 10,880,228 B2 | 12/2020 | Emmett et al. | |
| 10,958,757 B2 | 3/2021 | Appajanna et al. | |
| 10,999,406 B2 | 5/2021 | Narasimhan et al. | |
| 11,005,969 B2 | 5/2021 | Gupta et al. | |
| 11,153,227 B1 * | 10/2021 | Chamberlain | H04L 47/762 |
| 11,228,641 B1 | 1/2022 | Wagner et al. | |
| 11,936,518 B2 | 3/2024 | Kumar et al. | |
| 2017/0250891 A1 | 8/2017 | Brech et al. | |
| 2020/0162380 A1 * | 5/2020 | Pilkington | H04L 45/306 |
| 2021/0150411 A1 | 5/2021 | Coenders et al. | |
| 2022/0031867 A1 | 2/2022 | Nedergaard et al. | |
| 2022/0311773 A1 | 9/2022 | Zhou et al. | |
| 2022/0318671 A1 | 10/2022 | Chembakassery et al. | |
| 2022/0398150 A1 * | 12/2022 | Chopra | G06F 11/0751 |
| 2023/0229545 A1 * | 7/2023 | Yadav | G06F 11/0787 714/57 |
| 2025/0061276 A1 * | 2/2025 | Bansal | G06F 11/3476 |

* cited by examiner

*Primary Examiner* — Chau Le

(57) ABSTRACT

A plurality of data traffic patterns are generated based on call logs associated with previous data exchanges between a first microservice entity and a second microservice entity. It is determined based on a data policy that the second microservice entity is not authorized to consume a portion of the data exposed by the first microservice entity. In response, a first data traffic pattern of the plurality of data traffic patterns is identified that is associated with a first known data transfer or a first potential data transfer in which the second microservice entity consumes the portion of the data exposed by the first microservice entity. An alert associated with the first data traffic pattern is generated.

20 Claims, 2 Drawing Sheets

SYSTEM AND METHOD FOR IDENTIFYING UNAUTHORIZED DATA TRAFFIC IN A COMPUTING NETWORK

TECHNICAL FIELD

The present disclosure relates generally to network communication, and more specifically to a system and method for identifying unauthorized data traffic in a computing network.

BACKGROUND

The term "microservices" refers to a software architecture pattern where an application is built as a collection of small, independent, and loosely coupled services that work together to provide a complete functionality. Each microservice entity is a standalone component that can be developed, deployed, and scaled independently, allowing for greater flexibility and scalability in large-scale applications. Generally, there is minimal centralized management of these microservices, which can be written in different programming languages and use various data storage technologies. To implement an overall functionality of an application or platform, each microservice or microservice entity of a microservices network may expose one or more functionalities and associated data that can be consumed by other microservice entities. Due to the arrangement of a microservice network, there is a risk of rogue or unintentional traffic between microservice entities.

SUMMARY

The system and method implemented by the system as disclosed in the present disclosure provide technical solutions to the technical problems discussed above by avoiding unauthorized data traffic between microservice entities.

For example, the disclosed system and methods provide the practical application of predicting and avoiding/preventing unauthorized data transfers between microservice entities of a microservices network. As described in accordance with embodiments of the present disclosure, a transfer manager generates a plurality of possible data traffic patterns based on call logs associated with data transfers that previously occurred between microservice entities. Each data traffic pattern represents a known transfer of data that is to take place between two microservice entities or a potential transfer of data that can take place between the two microservice entities. Essentially, a data traffic pattern represents a possible data transfer than can take place between two microservice entities. The transfer manager may have access to data policies that specify/define which particular functionalities and further what data associated with the particular functionalities are to be exposed or made available by particular microservice entities, or which microservice entity is authorized to consume what portions of data of particular functionalities exposed by other microservice entities. Based on the data policies, the transfer manager may be configured to identify one or more data traffic patterns that represent unauthorized data transfers that are to occur between microservice entities. In response to identifying a data traffic pattern that represents an unauthorized data transfer between two microservice entities, the transfer manager may be configured to raise an alert associated with the identified data traffic pattern, wherein the alert indicates that an unauthorized data transfer associated with the identified data traffic pattern can occur between the two microservice entities. The alert allows support teams to reconfigure data transfers between the two microservice entities so that the identified unauthorized data transfer is avoided and/or prevented before it actually occurs.

By predicting unauthorized data transfers that can take place between microservice entities, the disclosed system and methods avoid unauthorized data transfers from occurring between microservice entities. This improves data security and network security associated with a computing network that implements the microservices network. Further, by predicting unauthorized data transfers that can take place between microservice entities at a future time, the disclosed system and methods avoid transmission of the unauthorized data over the network. This saves processing, memory and networking resources that may otherwise be used to generate and transmit the unauthorized data traffic. Avoiding unauthorized data traffic on the network reduces network traffic and improves network performance. Further, saving processing and memory resources of computing nodes that would otherwise be needed to generate, transmit and receive the unauthorized data traffic improves processing performance of the computing nodes that implement the microservice entities.

Thus, the disclosed system and methods improve technology associated with microservices networks and generally improve networking technology.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
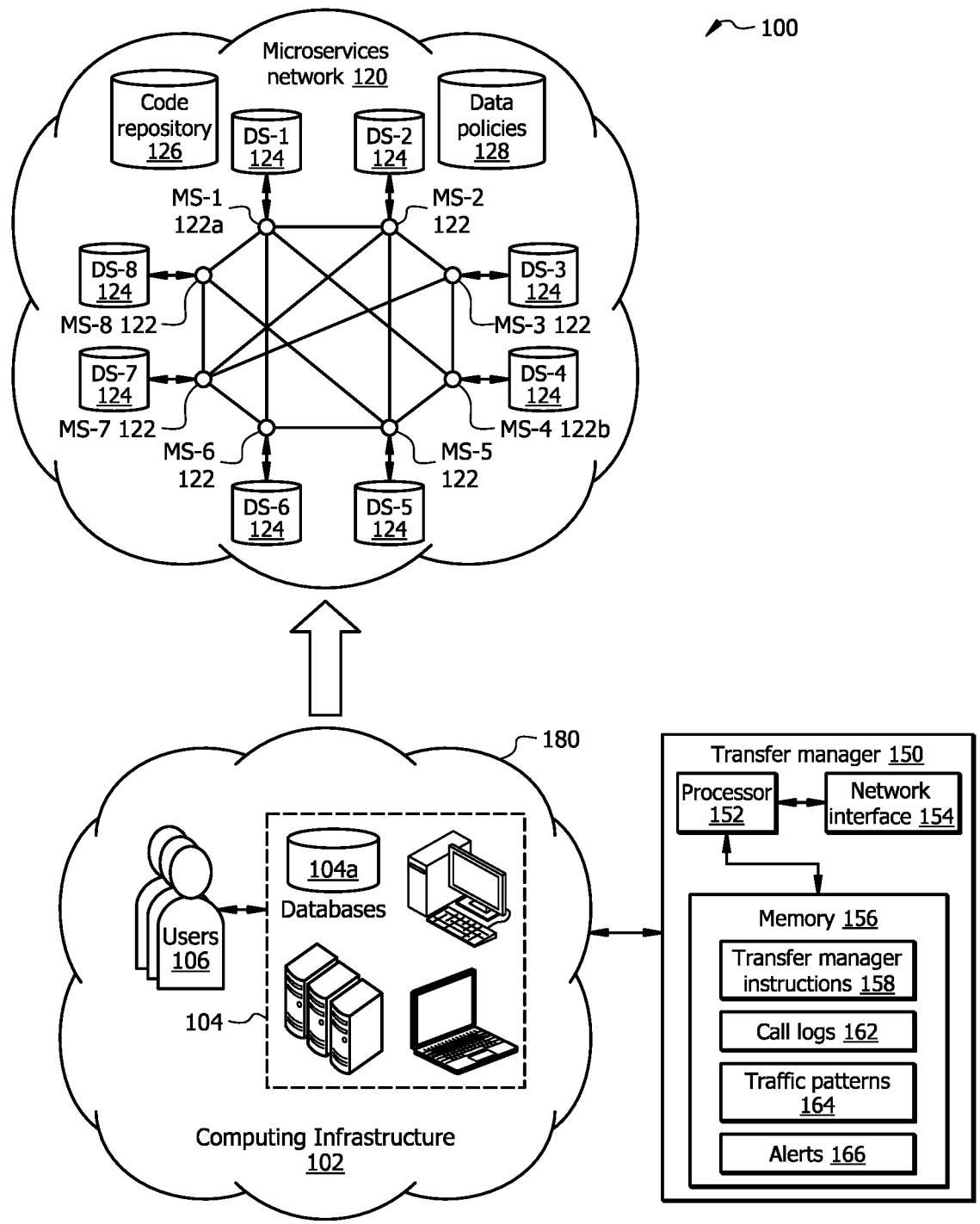
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 connected to a network 180. Computing infrastructure 102 may include a plurality of hardware and software components. The hardware components may include, but are not limited to, computing nodes 104 such as desktop computers, smartphones, tablet computers, laptop computers, servers and data centers (e.g., databases 104a), mainframe computers, virtual reality (VR) headsets, augmented reality (AR) glasses and other hardware devices such as printers, routers, hubs, switches, and memory all connected to the network 180. Software components may include software applications that are run by one or more of the computing nodes 104 including, but not limited to, operating systems, user interface applications, third party software, database management software, service management software, mainframe software, metaverse software, AI tools and other customized software programs (e.g., transfer manager 150) implementing particular functionalities. For example, software code relating to one or more software applications may be stored in a memory device and one or more processors (e.g., belonging to one or more computing nodes 104) may execute the software code to implement respective functionalities. An example software application run by one or more computing nodes 104 of the computing infrastructure 102 may include the transfer manager 150. In one embodiment, at least a portion of the computing infrastructure 102 may be representative of an Information Technology (IT) infrastructure of an organization.

One or more of the computing nodes 104 may be operated by a user 106. For example, a computing node 104 may provide a user interface using which a user 106 may operate the computing node 104 to perform data interactions within the computing infrastructure 102.

One or more computing nodes 104 of the computing infrastructure 102 may be representative of a computing system which hosts software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., transfer manager 150) as described below. In certain embodiments, one or more of the computing nodes 104 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

At least a portion of the computing infrastructure 102 (e.g., one or more computing nodes 104) may implement a microservices network 120 including a plurality of microservice entities 122 (shown as MS-1 to MS-8). The term "microservices" refers to a software architecture pattern where an application is built as a collection of small, independent, and loosely coupled services that work together to provide a complete functionality. Each microservice (e.g., microservice entities 122) is a standalone component that can be developed, deployed, and scaled independently, allowing for greater flexibility and scalability in large-scale applications. Generally, there is minimal centralized management of these microservices, which can be written in different programming languages and use various data storage technologies. To implement an overall functionality of an application or platform, each microservice or microservice entity (e.g., microservice entities 122) of a microservices network (e.g., microservices network 120) may expose one or more functionalities and associated data that can be consumed by other microservice entities 122. Microservice entities 122 may communicate with each other and perform data transfers using several communication protocols such as REST API calls and message brokers.

While there are several advantages to the decoupled nature of microservices, there is little control over data that is being transferred between the microservice entities 122 as there is no central control entity. So, there is a risk of rogue or unintentional traffic between microservice entities 122. For example, a microservice entity 122 may expose data to another microservice entity 122 that the other microservice entity 122 is not authorized to consume. These unauthorized data transfers between microservice entities 122 may potentially lead to data breaches and regulatory non-compliance.

Embodiments of the present disclosure describe techniques to predict and avoid/prevent unauthorized data transfers between microservice entities 122 of a microservices network 120.

At least a portion of the computing infrastructure 102 (e.g., one or more computing nodes 104) may implement a transfer manager 150 which may be configured to predict unauthorized data transfers between microservice entities 122 of a microservices network 120. The transfer manager 150 comprises a processor 152, a memory 156, and a network interface 154. The transfer manager 150 may be configured as shown in FIG. 1 or in any other suitable configuration.

The processor 152 comprises one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., transfer manager instructions 158) to implement the transfer manager 150. In this way, processor 152 may be a special-purpose computer designed to implement the functions disclosed herein. In one or more embodiments, the transfer manager 150 is implemented using logic units, FPGAs, ASICs, DSPs, or any other suitable hardware. The transfer manager 150 is configured to operate as described with reference to FIG. 2. For example, the processor 152 may be configured to perform at least a portion of the method 200 as described in FIG. 2.

The memory 156 comprises a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may comprise a read-only memory (ROM), random-access memory (RAM), ternary content-addressable memory (TCAM), dynamic random-access memory (DRAM), and static random-access memory (SRAM).

The memory 156 is operable to store the call logs 162 associated with data transfers (e.g., API calls) between microservice entities 122, data traffic patterns 164 associated with data transfers between the microservice entities 122, alerts 166 associated with unauthorized data transfers between the microservice entities 122, transfer manager instructions 158 and any other data needed to performed operations of the transfer manager 150 as described in embodiments of the present disclosure. The transfer manager instructions 158 may include any suitable set of instructions, logic, rules, or code operable to execute the transfer manager 150.

The network interface 154 is configured to enable wired and/or wireless communications. The network interface 154 is configured to communicate data between the transfer manager 150 and other devices, systems, or domains (e.g., computing nodes 104). For example, the network interface 154 may comprise a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that each of the computing nodes 104 may be implemented like the transfer manager 150 shown in FIG. 1. For example, each of the computing nodes 104 may have a respective processor and a memory that stores data and instructions to perform a respective functionality of the computing node 104.

The transfer manager 150 may be configured to predict unauthorized data transfers that may occur between microservice entities 122. In certain embodiments, the transfer manager 150 may have access to call logs 162 associated with data transfers that previously occurred between microservice entities 122 of the microservices network 120. In one embodiment, the call logs 162 may include records of actual data transfers that has occurred between various microservice entities 122 in a selected time frame. An example call log 162 of a particular data transfer that occurred between a first microservice entity 122a (shown as MS-1) and a second microservice entity 122b (shown as MS-4) may include, but is not limited to, an identity of the first microservice entity 122a, one or more of one or more functionalities and associated data exposed (e.g., made available) by the first microservice entity 122a, an identity of the second microservice entity 122b, or data or a portion thereof related to one or more of the functionalities consumed (e.g., transferred) by the second microservice entity 122b.

The transfer manager 150 may be configured to generate a plurality of data traffic patterns 164 based on the call logs 162. Each data traffic pattern 164 represents a known transfer of data that is to take place between two microservice entities 122 or a potential transfer of data that can take place between the two microservice entities 122. A data traffic pattern 164 may include, but is not limited to, one or more of an identity of a first microservice entity 122a that exposes data associated with one or more functionalities implemented by the first microservice entity 122a, data relating to the one or more functionalities exposed (e.g., made available) by the first microservice entity 122b, an identity of a second microservice entity 122b, at least a portion of the data being consumed (e.g., transferred) or that can be potentially consumed by the second microservice entity 122b, or a periodicity of the data transfer between the first and second microservice entities 122a and 122b.

For example, a data traffic pattern 164 may represent a known data transfer that is to occur at a future date and time. For example, the transfer manager 150 may determine from call logs 162 that a particular data transfer occurs periodically (e.g., daily, monthly, quarterly etc.) between a first microservice entity 122a and a second microservice entity 122b. Based on the identified periodicity of the data transfer between the first microservice entity 122a and the second microservice entity 122b, the transfer manager 150 may generate one or more data traffic patterns 164, wherein each of the one or more data traffic patterns 164 represent a single instance of the same data transfer that is to occur between the two microservice entities 122a and 122b in the future according to the determined periodicity. In this context, a data traffic pattern 164 that represents a known data transfer that is to occur between the first microservice entity 122a and the second microservice entity 122b may include the identity of the first microservice entity 122a, data relating to the one or more functionalities exposed (e.g., made available) by the first microservice entity 122b, an identity of the second microservice entity 122b, what portion of the data (exposed by the first microservice entity 122a) that is to be consumed (e.g., transferred) by the second microservice entity 122b, and a periodicity of the data transfers to occur between the first and second microservice entities 122a and 122b.

A data traffic pattern 164 may represent a potential data transfer that may occur between a first microservice entity 122a and a second microservice entity 122b. A potential data transfer between two microservice entities 122 may include a data transfer that is not configured to occur but can potentially occur between the two microservice entities 122. For example, based on the call logs 162 associated with data transfers that previously took place between the first microservice entity 122a and the second microservice entity 122b, the transfer manager 150 may determine that the first microservice entity 122a exposes (e.g., makes available) data relating to two different functionalities but the second microservice entity 122b only consumes data relating a first functionality only of the two functionalities. In this case, a potential data transfer that can occur between the first microservice entity 122a and the second microservice entity 122b is the second microservice entity 122b consuming data relating to the second functionality exposed by the first microservice entity 122a which is not presently being consumed by the second microservice entity 122b. In this context, a data traffic pattern 164 that represents the potential data transfer that can occur between the first microservice entity 122a and the second microservice entity 122b may include the identity of the first microservice entity 122a, data relating to the two functionalities exposed (e.g., made available) by the first microservice entity 122b, an identity of the second microservice entity 122b, and data relating to the second functionality that can potentially be consumed (e.g., transferred) by the second microservice entity 122b.

Thus, the transfer manager 150 is essentially configured to generate, based on the call logs 162, all possible data traffic patterns 164 associated with each pair of microservice entities 122.

In one embodiment, the transfer manager 150 may be configured to convert the call logs 162 into a text-based format (e.g., Json format). The transfer manager 150 may process the updated call logs to extract one or more of a list of microservice entities 122 involved in the data transfers recorded in the call logs 162, one or more functionalities and associated data exposed (e.g., made available) by the identified microservice entities 122, or one or more functionalities and associated data consumed by the identified microservice entities 122 (e.g., from other microservice entities). In one embodiment, the list of microservice entities 122 may include unique identities of the microservice entities 122. The transfer manager 150 may be configured to pass the information extracted from the call logs as input to a machine learning model that is trained to generate data traffic patterns 164 based on similar call log information. Based on the information input, the machine learning model generates all possible data traffic patterns 164 of data transfers that can take place between the microservice entities 122. In one embodiment, the machine learning model may use Bayesian Networks and reinforcement learning to identify the data traffic patterns 164.

In one or more embodiment, the transfer manager 150 may be configured to identify, from the call logs 162, a repetitive schedule for a particular data transfer that takes place between two microservice entities 122. The transfer manager 150 may be configured to generate a data traffic pattern 164 that represents the data transfer between the two microservice entities 122 and associate the identified repetitive schedule with the generated data traffic pattern 164. For example, the transfer manager 150 may determine from call logs 162 that a particular data transfer occurs periodically (e.g., daily, monthly, quarterly etc.) between a first microservice entity 122a and a second microservice entity 122b. The particular data transfer may include the second microservice entity 122b consuming data related to a first functionality from the first microservice entity 122a. In response to identifying the periodic data transfer between the two microservice entities 122a and 122b, the transfer manager 150 generates a data traffic pattern 164 that represents the transfer of data relating to the first functionality from the first microservice entity 122a to the second microservice entity 122b, and further associates the identified periodicity of the data transfer. Thus, the generated data traffic pattern 164 with the associated periodicity represents each future instance of the data transfer between the first microservice entity 122a and the second microservice entity 122b.

Once the data traffic patterns 164 representing possible data transfers between the microservice entities 122 are generated, the transfer manager 150 may be configured to determine whether one or more of the identified data traffic patterns represent unauthorized data transfers. In this context, the transfer manager 150 may have access to several pieces of information that allow the transfer manager 150 to determine whether a data transfer represented by a particular data pattern 164 is unauthorized.

In one embodiment, the transfer manager 150 may have access to data policies 128 that specify/define which particular functionalities and further what data associated with the particular functionalities are to be exposed or made available by particular microservice entities 122, or which microservice entity 122 is authorized to consume what portions of data of particular functionalities exposed by other microservice entities 122. In one embodiment, a data policy 128 may be a written document specifying authorized data transfers that can take place between microservice entities 122. Based on the data policies 128, the transfer manager 150 may be configured to identify one or more data traffic patterns 164 that represent unauthorized data transfers that are to occur between microservice entities 122. For example, based on the data policies 128, the transfer manager 150 may identify that a second microservice entity 122b is not authorized to consume a portion of the data exposed by a first microservice entity 122a. The transfer manager 150 may then identify a previously identified data traffic pattern 164 that represents a data transfer between the two microservice entities 122a and 122b in which the second microservice entity 122 is to consume the portion of the data from the first microservice entity 122a. Identifying data traffic patterns 164 that represent unauthorized data transfers that are to occur between microservice entities 122 allows the transfer manager 150 to predict unauthorized data transfers that are scheduled to occur or can potentially occur between two microservice entities 122. In response to identifying a data traffic pattern 164 that represents an unauthorized data transfer between two microservice entities 122, the transfer manager 150 may be configured to raise an alert 166 associated with the identified data traffic pattern 164, wherein the alert 166 indicates that an unauthorized data transfer associated with the identified data traffic pattern 164 can occur between the two microservice entities 122. The alert 166 allows support teams to reconfigure data transfers between the two microservice entities 122 so that the identified unauthorized data transfer is avoided and/or prevented before it actually occurs.

In some cases, one or more of the data policies 128 may change rendering a previously authorized data transfer unauthorized. The transfer manager 150 may be configured to detect changes in the data policies 128 and identify data transfers that are unauthorized based on the changed data policies 128. In cases where a data policy 128 is a written document, the transfer manager may employ natural language processing (NLP) to interpret the text of the data policy, and detect and interpret any changes that may have occurred between a previous version and a current version of the data policy. It may be noted that a change in data policies 128 may include one or more of addition of a new data policy, edits to an existing data policy, or deletion of an existing data policy.

In one example, a first data policy may define what data relating to which functionalities are to be exposed by the first microservice entity 122a. A second data policy may define which functionalities and what data relating to the functionalities are to be consumed by the second microservice entity 122b. The first data policy may change to specify that the first microservice entity 122a is to expose additional data associated with a particular functionality. The second data policy may specify that the second microservice entity 122b is authorized to consume data associated with the particular functionality from the first microservice entity 122a and further specify what data associated with the particular functionality the second microservice entity 122b is authorized to consume. However, the additional data that the first microservice entity 122a is to expose based on the changed first data policy may not be part of the data the second microservice entity 122b is authorized to consume according to the second data policy 128. For example, the second data policy may authorize the second microservice entity 122b to consume employee data exposed by the first microservice entity 122a and further specify that the second microservice entity 122b is authorized to consume employee data originating from USA, Japan and Brazil. The first data policy may change specifying that the first microservice entity 122a is to additionally expose (e.g., in addition to USA, Japan and Brazil) employee data from India. However, the second data policy does not allow the second microservice entity 122b to consume employee data originating from Japan. The transfer manager 150 may be configured to detect the change in the first data policy relating to the additional data to be exposed by the first microservice entity, and determine, based on the second data policy, that the second microservice entity 122b, which otherwise is authorized to consume data from the first microservice entity 122a relating to a particular functionality, is not authorized to consume the additional data relating to the particular functionality that is to be exposed by the first microservice entity 122a. Once the transfer manager 150 identifies that the second microservice entity 122b is not authorized to consume the additional data relating to the particular functionality exposed by the first microservice entity 122b, the transfer manager 150 identifies one or more data traffic patterns 164 that represent transfer of data relating to the particular functionality from the first microservice entity 122a and the second microservice entity 122b. The transfer manager 150 may raise an alert that the data transfer associated with the identified data traffic pattern 164 may include an unauthorized data transfer.

In another example, a data policy 128 may change to specify that the second microservice entity is no more authorized to consume a portion of the data exposed by the first microservice entity 122a, which the second microservice entity 122b was authorized to consume according to a previous version of the data policy 128. The transfer manager 150 may detect that a change has occurred in the data policy 128 and interpret the changed policy to determine that the second microservice entity 122b is no more authorized to consume the portion of the data exposed by the first microservice entity 122a. Once the transfer manager 150 identifies that the second microservice entity 122b is not authorized to consume the portion of the data exposed by the first microservice entity 122b, the transfer manager 150 identifies one or more data traffic patterns 164 that represent transfer of the portion of the data from the first microservice entity 122a and the second microservice entity 122b. The transfer manager 150 may raise an alert that the data transfer associated with the identified data traffic pattern 164 may include an unauthorized data transfer.

In addition to the data policies 128, the transfer manager 150 may have access to additional pieces of information that may allow the transfer manager 150 to identify data traffic patterns 164 representing unauthorized data transfers more accurately. For example, the transfer manager 150 may have access to data stores 124 that store data relating to functionalities exposed by the microservice entities 122. In this context, as shown in FIG. 1, each microservice entity 122 may be associated with a data store 124 (shown as DS-1 to DS-8) that stores data relating to one or more functionalities exposed by the microservice entity 122. The data stored in each of the data stores 124 may flow into the data store 124 from one or more data sources. In one embodiment, the data stores may be stored in one or more databases 104a.

In an additional or alternative embodiment, the transfer manager 150 may have access to a code repository 126 that stores information/algorithms (e.g., software code) that decide one or more of what data sources source data into a data store 124, what data is stored into a data store 124, how data received from various data sources is processed and stored in to a data store, or how and how often data is updated in a data store 124.

In one or more embodiments, the transfer manager may be configured to determine changes in data exposure by a microservice entity 122 based on monitoring data being stored/updated in the data store 124 associated with the microservice entity 122, monitoring the code repository 126 for changes in the software code (e.g., ETL logic) that controls data storage and updates in the data store 124 associated with the microservice entity 122, or a combination thereof. For example, in response to detecting a change in data updates to a data store 124, the transfer manager 150 may identify that an additional type of data has started flowing into a data store 124 from a particular date. Based on the detected change in the data updates, the transfer manager 150 may determine that the microservice entity 122 associated with the data store 124 is exposing the additional type of data for consumption by other microservice entities 122. In another example, in response to detecting a change in the software code (e.g., stored in the code repository 126) associated with updating/storing data in the data store 124, the transfer manager 150 may interpret the changed software code and determine that the additional type of data is being stored in the data store 124. Once the change is detected, the transfer manager 150 may examine the associated data policies 128 to determine whether the changes in data updates to the data store 124 and consequent changes in exposure of data by the respective microservice entity 122 may result in an unauthorized data transfer with another microservice entity 122.

In one or more embodiments, the transfer manager 150 uses a spectral clustering machine learning (ML) model to generate two clusters of the previously generated data traffic patterns 164, wherein a first cluster of the data traffic patterns 164 represent authorized data transfers and a second cluster of the data traffic patterns 164 represent unauthorized data transfers. In one embodiment, the generated data traffic patterns 164, the identified changes to the data policies 128, the identified changes to the data stores 124, the identified changes to the code repositories 126 are provided as input to the trained ML model, which generates the two clusters of authorized and unauthorized data traffic patterns 164.

Figure 2:
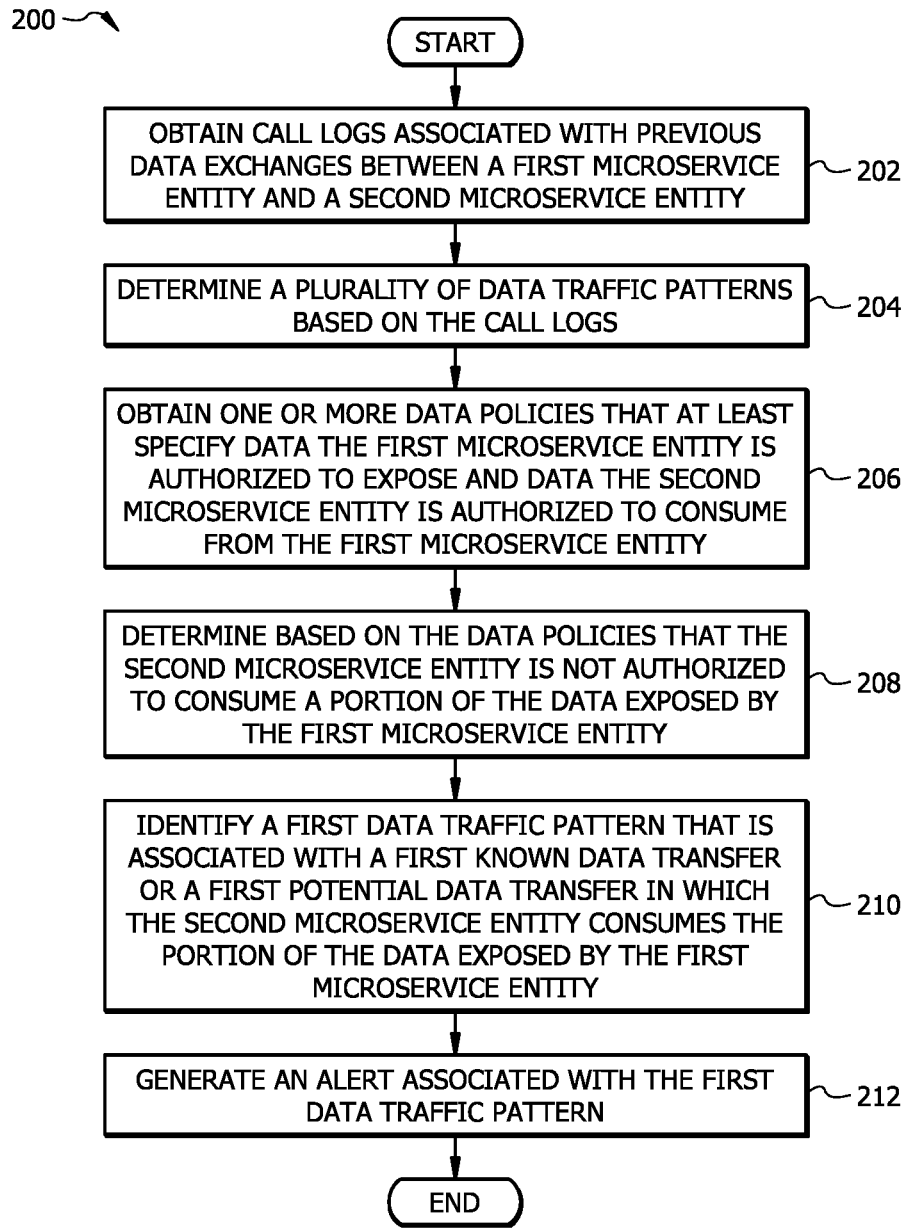
FIG. 2 illustrates a flowchart of an example method for predicting unauthorized data transfers between microservice entities, in accordance with one or more embodiments of the present disclosure.

FIG. 2 illustrates a flowchart of an example method 200 for predicting unauthorized data transfers between microservice entities 122, in accordance with one or more embodiments of the present disclosure. Method 200 may be performed by the transfer manager 150 shown in FIG. 1.

At operation 202, the transfer manager 150 obtains call logs 162 associated with previous data exchanges between a first microservice entity 122a and a second microservice entity 122b, wherein the first microservice entity 122a is configured to expose data associated with one or more functionalities and the second microservice entity 122b is configured to consume the data associated with at least one functionality from the one or more functionalities exposed by the first microservice entity 122a.

As described above, the transfer manager 150 may be configured to predict unauthorized data transfers that may occur between microservice entities 122. In certain embodiments, the transfer manager 150 may have access to call logs 162 associated with data transfers that previously occurred between microservice entities 122 of the microservices network 120. In one embodiment, the call logs 162 may include records of actual data transfers that has occurred between various microservice entities 122 in a selected time frame. An example call log 162 of a particular data transfer that occurred between a first microservice entity 122a (shown as MS-1) and a second microservice entity 122b (shown as MS-4) may include, but is not limited to, an identity of the first microservice entity 122a, one or more of one or more functionalities and associated data exposed (e.g., made available) by the first microservice entity 122a, an identity of the second microservice entity 122b, or data or a portion thereof related to one or more of the functionalities consumed (e.g., transferred) by the second microservice entity 122b.

At operation 204, the transfer manager 150 determines, based on the call logs 162, a plurality of data traffic patterns 164 associated with known data transfers that are to take place between the first microservice entity 122a and the second microservice entity 122b, and potential data transfers that can take place between the first microservice entity 122a and the second microservice entity 122b, wherein each data traffic pattern 164 at least comprises an identity of the first microservice entity 122a, data exposed by the first microservice entity 122a, an identity of the second microservice entity 122b, and at least a portion of the data being consumed or that can be potentially consumed by the second microservice entity 122b.

As described above, the transfer manager 150 may be configured to generate a plurality of data traffic patterns 164 based on the call logs 162. Each data traffic pattern 164 represents a known transfer of data that is to take place between two microservice entities 122 or a potential transfer of data that can take place between the two microservice entities 122. A data traffic pattern 164 may include, but is not limited to, one or more of an identity of a first microservice entity 122a that exposes data associated with one or more functionalities implemented by the first microservice entity 122a, data relating to the one or more functionalities exposed (e.g., made available) by the first microservice entity 122b, an identity of a second microservice entity 122b, at least a portion of the data being consumed (e.g., transferred) or that can be potentially consumed by the second microservice entity 122b, or a periodicity of the data transfer between the first and second microservice entities 122a and 122b.

For example, a data traffic pattern 164 may represent a known data transfer that is to occur at a future date and time. For example, the transfer manager 150 may determine from call logs 162 that a particular data transfer occurs periodically (e.g., daily, monthly, quarterly etc.) between a first microservice entity 122a and a second microservice entity 122b. Based on the identified periodicity of the data transfer between the first microservice entity 122a and the second microservice entity 122b, the transfer manager 150 may generate one or more data traffic patterns 164, wherein each of the one or more data traffic patterns 164 represent a single instance of the same data transfer that is to occur between the two microservice entities 122a and 122b in the future according to the determined periodicity. In this context, a data traffic pattern 164 that represents a known data transfer that is to occur between the first microservice entity 122a and the second microservice entity 122b may include the identity of the first microservice entity 122a, data relating to the one or more functionalities exposed (e.g., made available) by the first microservice entity 122b, an identity of the second microservice entity 122b, what portion of the data (exposed by the first microservice entity 122a) that is to be consumed (e.g., transferred) by the second microservice entity 122b, and a periodicity of the data transfers to occur between the first and second microservice entities 122a and 122b.

A data traffic pattern 164 may represent a potential data transfer that may occur between a first microservice entity 122a and a second microservice entity 122b. A potential data transfer between two microservice entities 122 may include a data transfer that is not configured to occur but can potentially occur between the two microservice entities 122. For example, based on the call logs 162 associated with data transfers that previously took place between the first microservice entity 122a and the second microservice entity 122b, the transfer manager 150 may determine that the first microservice entity 122a exposes (e.g., makes available) data relating to two different functionalities but the second microservice entity 122b only consumes data relating a first functionality only of the two functionalities. In this case, a potential data transfer that can occur between the first microservice entity 122a and the second microservice entity 122b is the second microservice entity 122b consuming data relating to the second functionality exposed by the first microservice entity 122a which is not presently being consumed by the second microservice entity 122b. In this context, a data traffic pattern 164 that represents the potential data transfer that can occur between the first microservice entity 122a and the second microservice entity 122b may include the identity of the first microservice entity 122a, data relating to the two functionalities exposed (e.g., made available) by the first microservice entity 122b, an identity of the second microservice entity 122b, and data relating to the second functionality that can potentially be consumed (e.g., transferred) by the second microservice entity 122b.

Thus, the transfer manager 150 is essentially configured to generate, based on the call logs 162, all possible data traffic patterns 164 associated with each pair of microservice entities 122.

At operation 206, the transfer manager 150 obtains one or more data policies 128 that at least specify data the first microservice entity 122a is authorized to expose and data the second microservice entity 122b is authorized to consume from the first microservice entity 122a.

At operation 208, the transfer manager 150 determines, based on the one or more data policies 128 that the second microservice entity 122b is not authorized to consume a portion of the data exposed by the first microservice entity 122a.

At operation 210, in response to determining that the second microservice entity 122b is not authorized to consume the portion of the data exposed by the first microservice entity 122a, the transfer manager 150 identifies a first data traffic pattern 164, from the plurality of data traffic patterns 164, that is associated with a first known data transfer or a first potential data transfer in which the second microservice entity 122b consumes the portion of the data exposed by the first microservice entity 122a.

As described above, once the data traffic patterns 164 representing possible data transfers between the microservice entities 122 are generated, the transfer manager 150 may be configured to determine whether one or more of the identified data traffic patterns represent unauthorized data transfers. In this context, the transfer manager 150 may have access to several pieces of information that allow the transfer manager 150 to determine whether a data transfer represented by a particular data pattern 164 is unauthorized.

In one embodiment, the transfer manager 150 may have access to data policies 128 that specify/define which particular functionalities and further what data associated with the particular functionalities are to be exposed or made available by particular microservice entities 122, or which microservice entity 122 is authorized to consume what portions of data of particular functionalities exposed by other microservice entities 122. In one embodiment, a data policy 128 may be a written document specifying authorized data transfers that can take place between microservice entities 122. Based on the data policies 128, the transfer manager 150 may be configured to identify one or more data traffic patterns 164 that represent unauthorized data transfers that are to occur between microservice entities 122. For example, based on the data policies 128, the transfer manager 150 may identify that a second microservice entity 122b is not authorized to consume a portion of the data exposed by a first microservice entity 122a. The transfer manager 150 may then identify a previously identified data traffic pattern 164 that represents a data transfer between the two microservice entities 122a and 122b in which the second microservice entity 122 is to consume the portion of the data from the first microservice entity 122a. Identifying data traffic patterns 164 that represent unauthorized data transfers that are to occur between microservice entities 122 allows the transfer manager 150 to predict unauthorized data transfers that are scheduled to occur or can potentially occur between two microservice entities 122.

At operation 212, the transfer manager 150 generates an alert 166 associated with the first data traffic pattern 164, wherein the alert 166 indicates that an unauthorized data transfer associated with the first data traffic pattern 164 can occur between the first microservice entity 122a and the second microservice entity 122b.

As described above, in response to identifying a data traffic pattern 164 that represents an unauthorized data transfer between two microservice entities 122, the transfer manager 150 may be configured to raise an alert 166 associated with the identified data traffic pattern 164, wherein the alert 166 indicates that an unauthorized data transfer associated with the identified data traffic pattern 164 can occur between the two microservice entities 122. The alert 166 allows support teams to reconfigure data transfers between the two microservice entities 122 so that the identified unauthorized data transfer is avoided and/or prevented before it actually occurs.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
a plurality of computing nodes of a computing network, wherein one or more of the plurality of computing nodes implement a plurality of microservice entities, wherein each microservice entity implements one or more functionalities and is configured to expose data associated with the one or more functionalities for consumption by one or more other microservice entities;
one or more databases of the computing network, wherein the databases are configured to store a plurality of data stores, wherein each data store is associated with a microservice entity and stores data exposed by the microservice entity for consumption by one or more other microservice entities; and
a processor communicatively coupled to the plurality of computing nodes and the one or more databases, wherein the processor is configured to:
obtain call logs associated with previous data exchanges between a first microservice entity and a second microservice entity, wherein the first microservice entity is configured to expose data associated with one or more functionalities and the second microservice entity is configured to consume the data associated with at least one functionality from the one or more functionalities exposed by the first microservice entity;
determine, based on the call logs, a plurality of data traffic patterns associated with known data transfers that are to take place between the first microservice entity and the second microservice entity, and potential data transfers that can take place between the first microservice entity and the second microservice entity, wherein each data traffic pattern at least comprises an identity of the first microservice entity, data exposed by the first microservice entity, an identity of the second microservice entity, and at least a portion of the data being consumed or that can be potentially consumed by the second microservice entity;
obtain one or more data policies that at least specify data the first microservice entity is authorized to expose and data the second microservice entity is authorized to consume from the first microservice entity;
determine, based on the one or more data policies that the second microservice entity is not authorized to consume a portion of the data exposed by the first microservice entity;
in response to determining that the second microservice entity is not authorized to consume the portion of the data exposed by the first microservice entity, identify a first data traffic pattern, from the plurality of data traffic patterns, that is associated with a first known data transfer or a first potential data transfer in which the second microservice entity consumes the portion of the data exposed by the first microservice entity; and
generate an alert associated with the first data traffic pattern, wherein the alert indicates that an unauthorized data transfer associated with the first data traffic pattern can occur between the first microservice entity and the second microservice entity.

2. The system of claim 1, wherein the processor is further configured to:
generate updated call logs by converting the call logs into a text-based format;
perform Natural Language Processing (NLP) of the updated call logs to extract the identities of the first microservice entity and the second microservice entity associated with the data transfers relating to the call logs, one or more functionalities and associated data exposed by the first microservice entity, and one or more of the functionalities and the associated data consumed by the second microservice entity; and
determine a plurality of possible data traffic patterns associated with the data transfers between the first microservice entity and the second microservice entity.

3. The system of claim 1, wherein:
one or more of the data traffic patterns indicate a schedule of respective repetitive data transfers associated with the data traffic patterns;

the first data traffic pattern indicates a first schedule for repetition of the first known data transfer or the first potential data transfer between the first microservice entity and the second microservice entity; and the processor is further configured to:

in response to determining that the second microservice entity is not authorized to consume the portion of the data exposed by the first microservice entity, determine that one or more instances of the first known data transfer or the first potential data transfer scheduled according to the first schedule are unauthorized data transfers.

4. The system of claim 1, wherein the processor is further configured to:

detect that a text of a first data policy of the one or more data policies has changed between a previous version and a current version of the first data policy;

determine based on the current version of the first data policy that the first microservice entity is configured to expose additional data associated with a particular functionality which the second microservice entity is configured to consume; and determine, based on a second data policy of the one or more data policies, that the second microservice entity is not authorized to consume the additional data.

5. The system of claim 4, wherein the processor is further configured to:

monitor a first data store and a first code repository associated with the first microservice entity, wherein the first data store is configured to store the data that is exposed by the first microservice entity and the first code repository comprises software code implementing data extraction from one or more data sources and storage of the data in the first data store; and determine based on changes to the software code stored in the first code repository and the changes in the data stored in the first data store, that the first microservice entity is configured to expose the additional data associated with the particular functionality.

6. The system of claim 1, wherein the processor is further configured to:

detect that a text of a first data policy of the one or more data policies has changed between a previous version and a current version of the first data policy; and determine based on the current version of the first data policy that the second microservice is no more authorized to consume a portion of data exposed by the first microservice which the second microservice was authorized to consume according to the previous version of the first data policy.

7. The system of claim 1, wherein the potential data transfers that can take place between the first microservice entity and the second microservice entity comprises the second microservice entity potentially consuming data associated with a particular functionality being exposed by the first microservice entity which the second microservice entity is not configured to consume.

8. A method for predicting unauthorized data transfers comprising:

obtaining call logs associated with previous data exchanges between a first microservice entity and a second microservice entity, wherein:

the first microservice entity and the second microservice entity are part of a plurality of microservice entities;

one or more of a plurality of computing nodes of a computing network implement the plurality of microservice entities;

each microservice entity implements one or more functionalities and is configured to expose data associated with the one or more functionalities for consumption by one or more other microservice entities;

one or more databases of the computing network are configured to store a plurality of data stores;

each data store is associated with a microservice entity and stores data exposed by the microservice entity for consumption by one or more other microservice entities; and the first microservice entity is configured to expose data associated with one or more functionalities and the second microservice entity is configured to consume the data associated with at least one functionality from the one or more functionalities exposed by the first microservice entity;

determining, based on the call logs, a plurality of data traffic patterns associated with known data transfers that are to take place between the first microservice entity and the second microservice entity, and potential data transfers that can take place between the first microservice entity and the second microservice entity, wherein each data traffic pattern at least comprises an identity of the first microservice entity, data exposed by the first microservice entity, an identity of the second microservice entity, and at least a portion of the data being consumed or that can be potentially consumed by the second microservice entity;

obtaining one or more data policies that at least specify data the first microservice entity is authorized to expose and data the second microservice entity is authorized to consume from the first microservice entity;

determining, based on the one or more data policies that the second microservice entity is not authorized to consume a portion of the data exposed by the first microservice entity;

in response to determining that the second microservice entity is not authorized to consume the portion of the data exposed by the first microservice entity, identifying a first data traffic pattern, from the plurality of data traffic patterns, that is associated with a first known data transfer or a first potential data transfer in which the second microservice entity consumes the portion of the data exposed by the first microservice entity; and generating an alert associated with the first data traffic pattern, wherein the alert indicates that an unauthorized data transfer associated with the first data traffic pattern can occur between the first microservice entity and the second microservice entity.

9. The method of claim 8, further comprising:

generating updated call logs by converting the call logs into a text-based format;

performing Natural Language Processing (NLP) of the updated call logs to extract the identities of the first microservice entity and the second microservice entity associated with the data transfers relating to the call logs, one or more functionalities and associated data exposed by the first microservice entity, and one or more of the functionalities and the associated data consumed by the second microservice entity; and determining a plurality of possible data traffic patterns associated with the data transfers between the first microservice entity and the second microservice entity.

10. The method of claim 8, wherein:
one or more of the data traffic patterns indicate a schedule of respective repetitive data transfers associated with the data traffic patterns;
the first data traffic pattern indicates a first schedule for repetition of the first known data transfer or the first potential data transfer between the first microservice entity and the second microservice entity; and
further comprising:
in response to determining that the second microservice entity is not authorized to consume the portion of the data exposed by the first microservice entity, determine that one or more instances of the first known data transfer or the first potential data transfer scheduled according to the first schedule are unauthorized data transfers.

11. The method of claim 8, further comprising:
detecting that a text of a first data policy of the one or more data policies has changed between a previous version and a current version of the first data policy;
determining based on the current version of the first data policy that the first microservice entity is configured to expose additional data associated with a particular functionality which the second microservice entity is configured to consume; and
determining, based on a second data policy of the one or more data policies, that the second microservice entity is not authorized to consume the additional data.

12. The method of claim 11, further comprising:
monitoring a first data store and a first code repository associated with the first microservice entity, wherein the first data store is configured to store the data that is exposed by the first microservice entity and the first code repository comprises software code implementing data extraction from one or more data sources and storage of the data in the first data store; and
determining based on changes to the software code stored in the first code repository and the changes in the data stored in the first data store, that the first microservice entity is configured to expose the additional data associated with the particular functionality.

13. The method of claim 8, further comprising:
detecting that a text of a first data policy of the one or more data policies has changed between a previous version and a current version of the first data policy; and
determining based on the current version of the first data policy that the second microservice is no more authorized to consume a portion of data exposed by the first microservice which the second microservice was authorized to consume according to the previous version of the first data policy.

14. The method of claim 8, wherein the potential data transfers that can take place between the first microservice entity and the second microservice entity comprises the second microservice entity potentially consuming data associated with a particular functionality being exposed by the first microservice entity which the second microservice entity is not configured to consume.

15. A non-transitory computer-readable medium storing instructions that when executed by a processor causes the processor to:
obtain call logs associated with previous data exchanges between a first microservice entity and a second microservice entity, wherein:
the first microservice entity and the second microservice entity are part of a plurality of microservice entities;
one or more of a plurality of computing nodes of a computing network implement the plurality of microservice entities;
each microservice entity implements one or more functionalities and is configured to expose data associated with the one or more functionalities for consumption by one or more other microservice entities;
one or more databases of the computing network are configured to store a plurality of data stores; and
each data store is associated with a microservice entity and stores data exposed by the microservice entity for consumption by one or more other microservice entities;
the first microservice entity is configured to expose data associated with one or more functionalities and the second microservice entity is configured to consume the data associated with at least one functionality from the one or more functionalities exposed by the first microservice entity;
determine, based on the call logs, a plurality of data traffic patterns associated with known data transfers that are to take place between the first microservice entity and the second microservice entity, and potential data transfers that can take place between the first microservice entity and the second microservice entity, wherein each data traffic pattern at least comprises an identity of the first microservice entity, data exposed by the first microservice entity, an identity of the second microservice entity, and at least a portion of the data being consumed or that can be potentially consumed by the second microservice entity;
obtain one or more data policies that at least specify data the first microservice entity is authorized to expose and data the second microservice entity is authorized to consume from the first microservice entity;
determine, based on the one or more data policies that the second microservice entity is not authorized to consume a portion of the data exposed by the first microservice entity;
in response to determining that the second microservice entity is not authorized to consume the portion of the data exposed by the first microservice entity, identify a first data traffic pattern, from the plurality of data traffic patterns, that is associated with a first known data transfer or a first potential data transfer in which the second microservice entity consumes the portion of the data exposed by the first microservice entity; and
generate an alert associated with the first data traffic pattern, wherein the alert indicates that an unauthorized data transfer associated with the first data traffic pattern can occur between the first microservice entity and the second microservice entity.

16. The non-transitory computer-readable medium of claim 15, wherein the instructions further cause the processor to:
generate updated call logs by converting the call logs into a text-based format;
perform Natural Language Processing (NLP) of the updated call logs to extract the identities of the first microservice entity and the second microservice entity associated with the data transfers relating to the call logs, one or more functionalities and associated data exposed by the first microservice entity, and one or more of the functionalities and the associated data consumed by the second microservice entity; and determine a plurality of possible data traffic patterns associated with the data transfers between the first microservice entity and the second microservice entity.

17. The non-transitory computer-readable medium of claim 15, wherein:

one or more of the data traffic patterns indicate a schedule of respective repetitive data transfers associated with the data traffic patterns;

the first data traffic pattern indicates a first schedule for repetition of the first known data transfer or the first potential data transfer between the first microservice entity and the second microservice entity; and the instructions further cause the processor to:

in response to determining that the second microservice entity is not authorized to consume the portion of the data exposed by the first microservice entity, determine that one or more instances of the first known data transfer or the first potential data transfer scheduled according to the first schedule are unauthorized data transfers.

18. The non-transitory computer-readable medium of claim 15, wherein the instructions further cause the processor to:

detect that a text of a first data policy of the one or more data policies has changed between a previous version and a current version of the first data policy;

determine based on the current version of the first data policy that the first microservice entity is configured to expose additional data associated with a particular functionality which the second microservice entity is configured to consume; and determine, based on a second data policy of the one or more data policies, that the second microservice entity is not authorized to consume the additional data.

19. The non-transitory computer-readable medium of claim 18, wherein the instructions further cause the processor to:

monitor a first data store and a first code repository associated with the first microservice entity, wherein the first data store is configured to store the data that is exposed by the first microservice entity and the first code repository comprises software code implementing data extraction from one or more data sources and storage of the data in the first data store; and determine based on changes to the software code stored in the first code repository and the changes in the data stored in the first data store, that the first microservice entity is configured to expose the additional data associated with the particular functionality.

20. The non-transitory computer-readable medium of claim 15, wherein the instructions further cause the processor to:

detect that a text of a first data policy of the one or more data policies has changed between a previous version and a current version of the first data policy; and determine based on the current version of the first data policy that the second microservice is no more authorized to consume a portion of data exposed by the first microservice which the second microservice was authorized to consume according to the previous version of the first data policy.

\* \* \* \* \*